Figure 9:
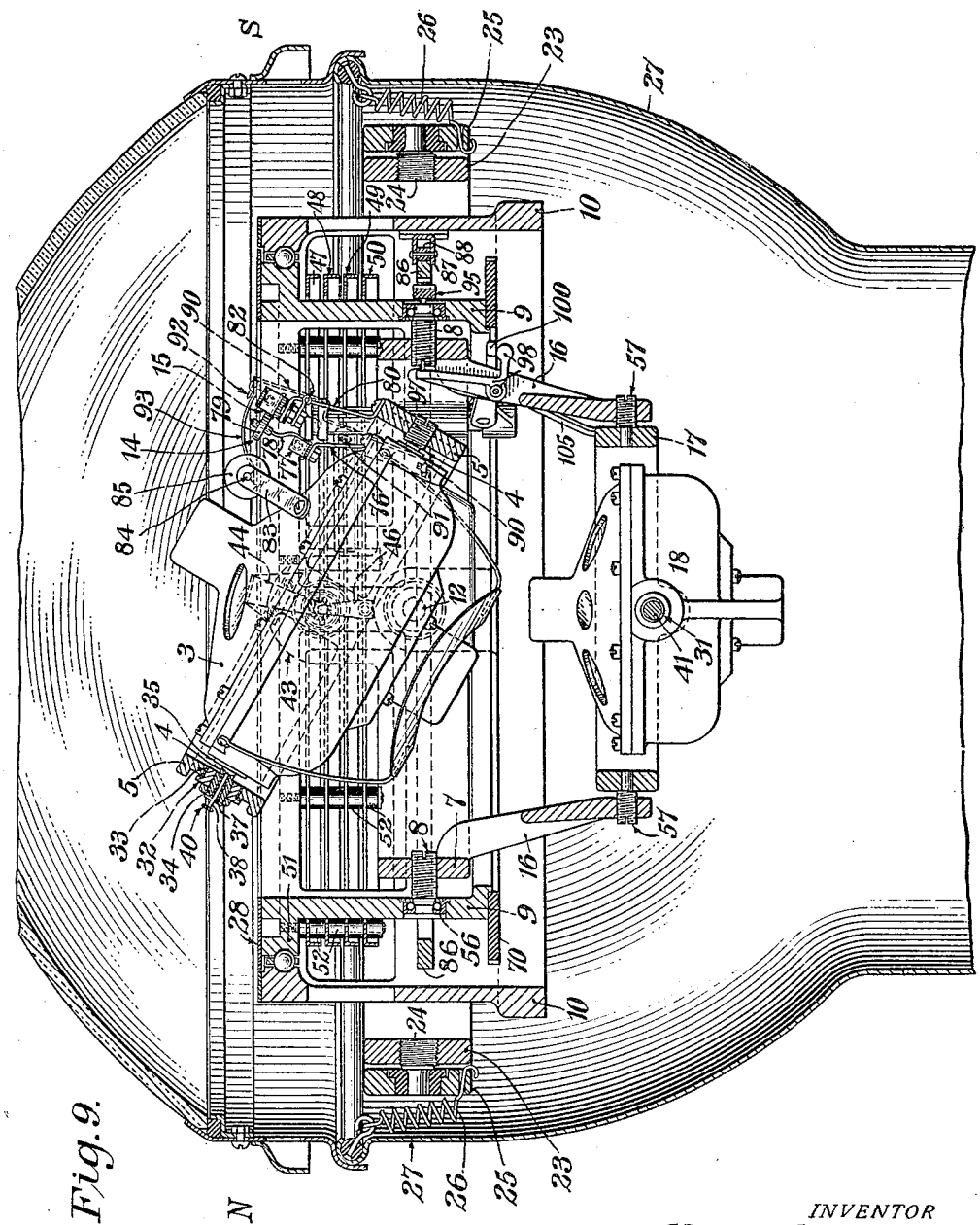

Feb. 5, 1929.
H. L. TANNER
1,701,283
GYROSCOPIC COMPASS
Filed May 13, 1921    6 Sheets-Sheet 1
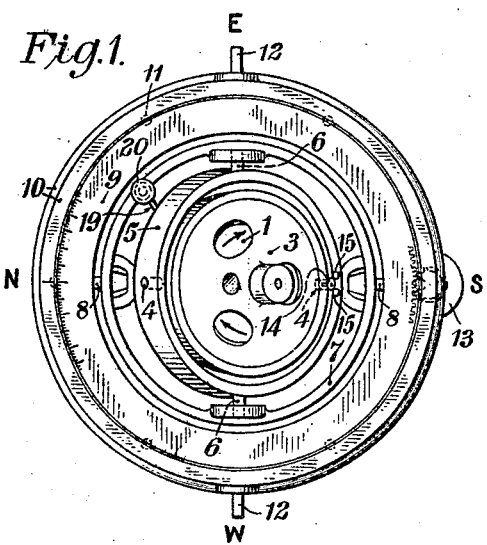
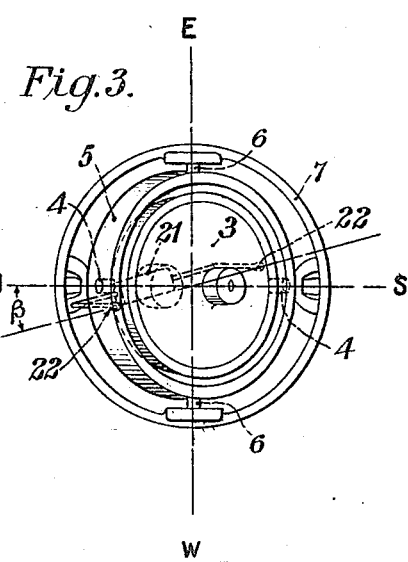
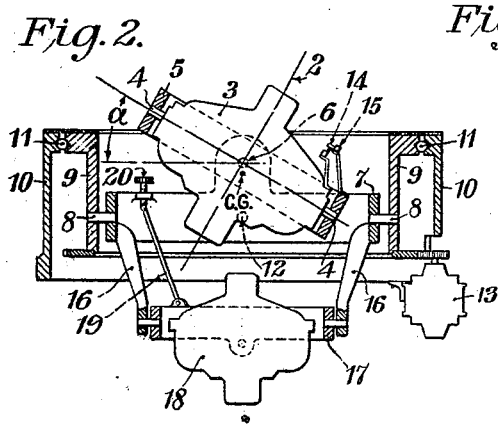
INVENTOR
Harry L. Tanner
BY
Moakley and Gill
ATTORNEYS.

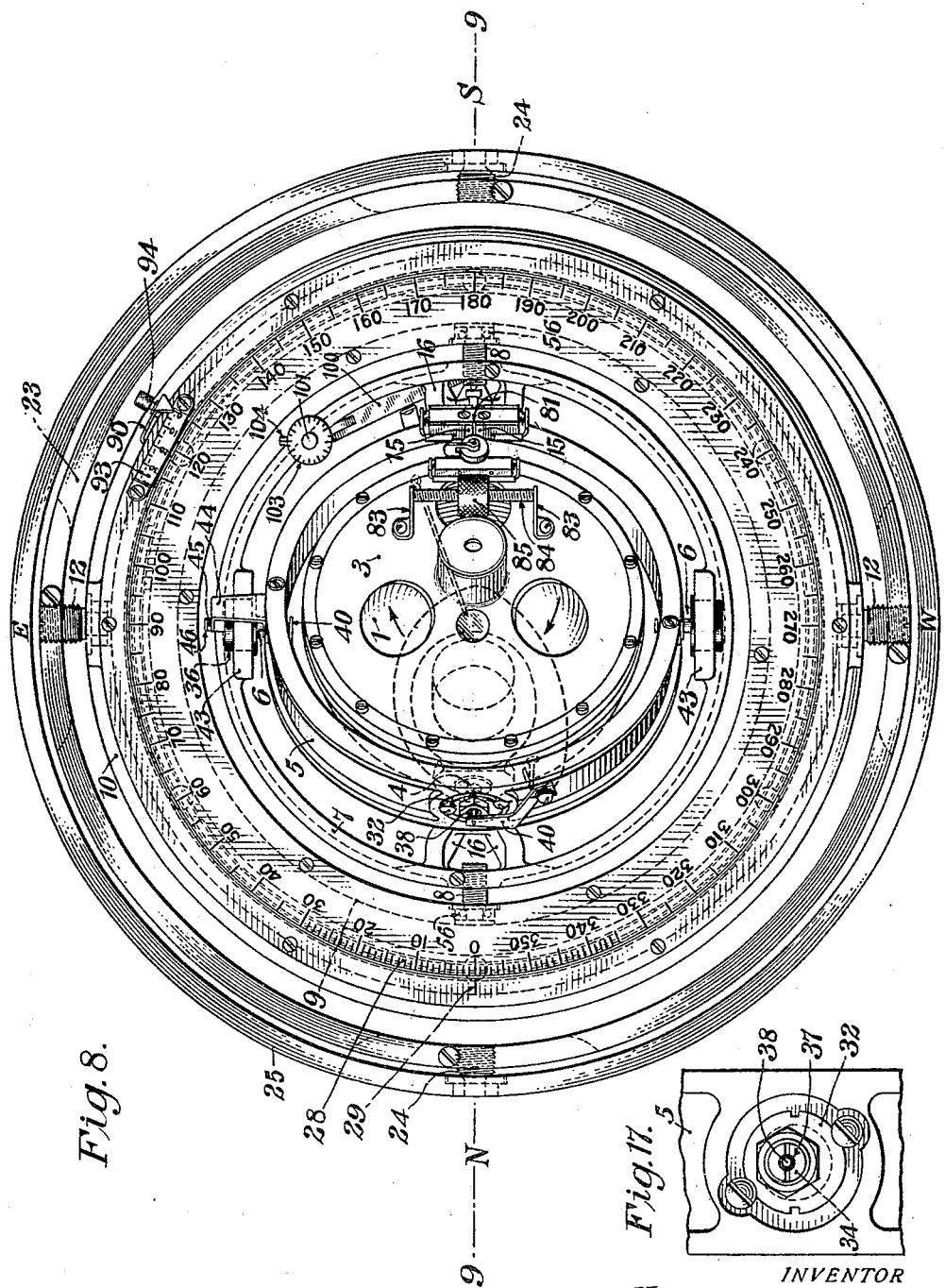

Feb. 5, 1929.

H. L. TANNER 1,701,283

GYROSCOPIC COMPASS

Filed May 13, 1921

6 Sheets-Sheet 3

INVENTOR
Harry L. Tanner
BY
Moakley and Gill
ATTORNEYS.

Feb. 5, 1929.

H. L. TANNER

GYROSCOPIC COMPASS

Filed May 13, 1921

1,701,283

6 Sheets-Sheet 4

INVENTOR
Harry L. Tanner
BY
Moahley and Gill
ATTORNEYS

Feb. 5, 1929.

H. L. TANNER 1,701,283

GYROSCOPIC COMPASS

Filed May 13, 1921      6 Sheets-Sheet 5

INVENTOR
Harry L. Tanner
BY
Moahley and Gill
ATTORNEYS.

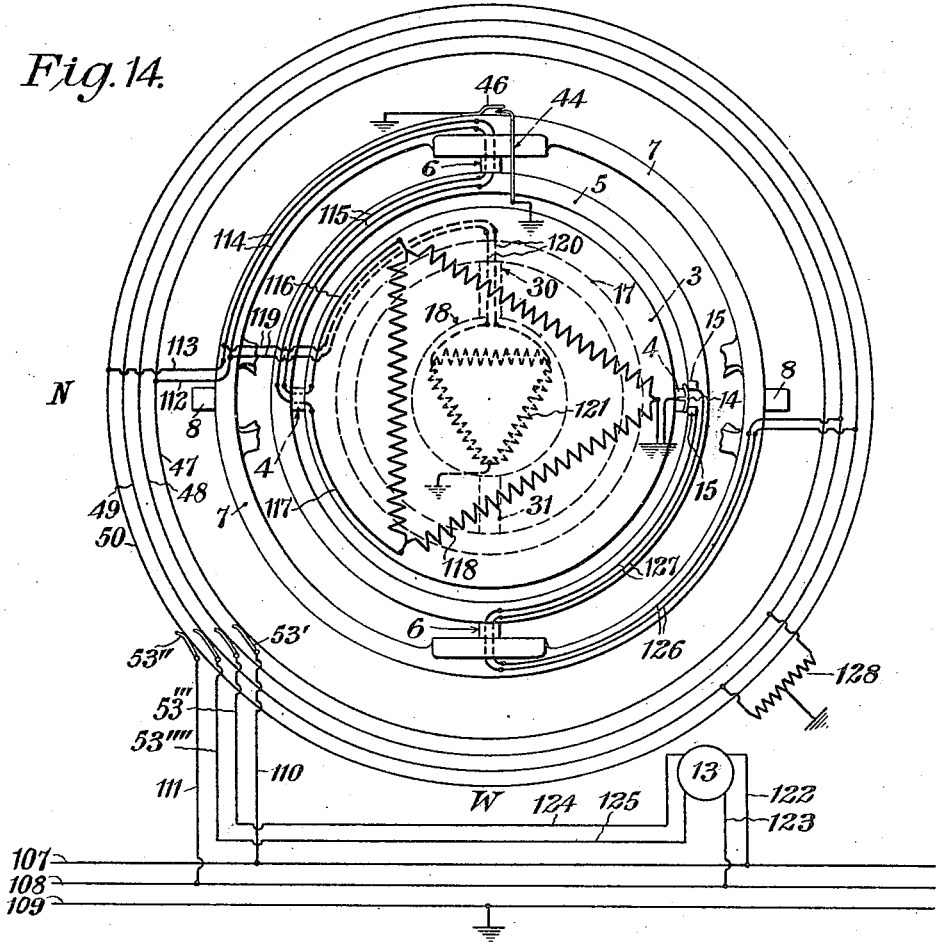

Patented Feb. 5, 1929.

1,701,283

UNITED STATES PATENT OFFICE.

HARRY L. TANNER, OF BROOKLYN, NEW YORK, ASSIGNOR TO FORD INSTRUMENT COMPANY, INC., OF NEW YORK, N. Y., A CORPORATION OF NEW YORK.

GYROSCOPIC COMPASS.

Application filed May 13, 1921. Serial No. 469,201.

This invention relates to meridian seeking gyroscopic compasses.

Following the early experiments of Foucault with a gyroscopic compass in which meridian seeking properties were imparted to a gyroscope by suppressing one of its three degrees of freedom, many attempts have been made to overcome the disadvantages of the early types of compass and produce instruments better adapted for use on ship board than were the early experimental devices. A number of instruments have been proposed, some of which have gone into use, but all of them, so far as I am aware, have been constructed along the general lines of the original Foucault compass, by arranging the gyroscopic element to have three degrees of freedom, one about its spinning axis and the others about two supporting axes perpendicular to each other and to the spinning axis, one of the supporting axes being vertical and the other horizontal. In order to cause the gyroscopic element to seek the meridian one of its degrees of freedom, usually that about its horizontal supporting axis, is suppressed, as by making the element pendulous or in some other suitable manner.

An instrument of this general type is subject to ballistic deflections due to acceleration and retardation pressures and to the effect upon its sensitive element of oscillatory motion of the craft upon which it is carried. It is also subject to deviations due to meridional components of the movement of the craft, this deviation being affected by course, speed and latitude.

The development of the Foucault type of compass has been concerned chiefly with the improvement of structural features and the provision of arrangements for correcting for the errors due to the causes mentioned above, in order to render the instruments suitable for navigation purposes, but in all cases the plane of rotation of the gyroscope has been kept perpendicular to the surface of the earth, and its spinning axis parallel thereto.

In types of compass at present in use the sensitive element is suspended from a follow-up or phantom element by means of a filament or is carried upon a mercury float arrangement or supported upon a film of oil or the like. These arrangements are open to many objections, require frequent and careful adjustment, and renewal of liquids in case the latter are used, and increase the cost of the complete instrument.

The follow-up element upon which the sensitive element may be mounted in any of the ways mentioned above carries the compass card and is arranged to be moved in azimuth by means of a motor controlled by a device consisting of a contact member associated with the sensitive element and movable in azimuth therewith about the vertical supporting axis. This contact member cooperates with a pair of contact members associated with the follow-up element, the arrangement being such that upon relative movement in azimuth between the gyroscope and the craft due to a change in course, the movable contact member will engage one or the other of the contact members of the pair to energize the motor and cause the follow-up element to move with the gyroscope and therefore be displaced with respect to the lubber's line to indicate the new course, the lubber's line being placed upon a part of the instrument which is fixed with respect to the craft, except as it may be movable to correct for the deviations due to meridional components of the movement of the craft under varying conditions of speed and course.

Various methods have been employed for correcting for such deviations, to which all gyroscopic compasses at present in use are subject. The readings of the compasses may be corrected mathematically by means of data obtained from suitable correction tables, or mechanically, by means of mechanism movable in proportion to the correction which should be applied. The arrangement commonly employed for this purpose is one in which the lubber's line is mounted upon a movable member which is shifted in accordance with the several factors which enter into the resulting correction, such as heading, speed and latitude of the craft. Arrangements of this kind are complicated, require careful adjustment and do not take care of all of the factors entering into the deviations.

To cause the sensitive element to seek the meridian means are provided for applying a torque about its horizontal supporting axis to cause it to precess about its vertical supporting axis toward the meridian. This torque is usually applied by the force of gravity acting upon the gyroscope either directly, as by making it pendulous, or indirectly as by connecting thereto a pendulous mass or a liquid level arrangement. In all of these arrangements the effect upon the torque applying device of acceleration or retardation pressures due to changes in course or speed of the craft will result in ballistic deflections which must be corrected in order to obtain true readings under the new conditions of course or speed.

In instruments of the general types referred to above, failure of the follow-up motor to function properly may result in injury to the instrument due to the precession caused by the torque applied about the vertical axis by turning of the craft.

It is an object of this invention to provide a gyroscopic compass which shall possess, among others, the following advantages over prior types of instruments.

The use of delicate mechanism for supporting the gyroscopic element is avoided, thereby simplifying the construction of the instrument, lessening its cost and eliminating the necessity for frequent and careful adjustments.

Displacement of the compass card element due to meridional components of the speed of the craft upon which the compass is carried is prevented, so that the element will occupy its true position with respect to the points of the compass, and the lubber's line may occupy a fixed relation to the craft instead of being movably mounted to permit it to be shifted in accordance with the correction which should be applied as in prior compasses.

The instrument is so constructed that the degrees of freedom of its gyroscopic element about two mutually perpendicular supporting axes may be suppressed in order to cause the element to follow the movement of the craft over the surface of the earth and maintain its normal relation to this surface independently of latitude. By virtue of this construction the effect upon the element of acceleration and retardation pressures due to changes in speed of the craft will be automatically taken care of, and such corrections as may be necessary to meet new conditions of speed can be easily applied.

The arrangement of the parts of the instrument is one that makes the best use of the space available and results in an instrument of compact design in which the compass card is entirely unobstructed, thereby rendering the instrument particularly adapted for direct observations. The outer parts of the instrument which carry the compass card and the lubber's line need not be as accurately balanced as in other types. This is of particular advantage when azimuth sighting devices are used with the instrument, as their weight and the pressure exerted upon them during use will not produce a disturbance of accurately balanced parts, as is the case with other forms of gyroscopic compasses.

The instrument is not liable to injury due to failure of any of its parts to function properly and may be easily restored to operative condition when the defect has been remedied.

The above advantages of the invention, as well as others which will hereinafter appear, are attained by providing a mass, such as the rotor of an electrically driven gyroscope, which is arranged to spin about an axis having a substantially constant inclination to the surface of the earth and normally bearing a fixed relation to the plane of the meridian. The rotating mass is surrounded by a case which serves as a support for the mass and may turn in the plane of the mass about the inclined axis of the latter independently of the rotary movement of the mass within the case. The coils constituting the stator of the gyroscope may be mounted within the case.

The case is mounted within an inner supporting member upon an axis lying in the plane of the case. The inner supporting member may be mounted upon a horizontal axis perpendicular to the supporting axis of the case within another supporting member which in turn is mounted upon a horizontal axis within a horizontal inner frame, or the inner supporting member may in some cases be mounted directly upon the frame upon a horizontal axis perpendicular to the supporting axis of the case.

The use of vertical bearings which, even if of the ball type, are less sensitive than are horizontal bearings, is thus avoided, and it is possible to use knife edge bearings throughout the instrument to lessen friction or for any other reason. No torsion suspensions, mercury floats, oil film bearings or other delicate supporting arrangements are necessary, and all of the disadvantages attending their use are entirely eliminated.

The inner frame which may carry the compass card of the instrument is movably mounted upon an outer frame which has a fixed relation to the craft upon which the compass is carried, as by being mounted in the gimbal rings of a binnacle, and may bear the lubber's line. Operatively connected to the inner frame is a driving element, such as an electric servo motor controlled by contact mechanism consisting in general of two relatively movable parts one of which is connected to the case or to a part of the instrument adapted to move with the case, and the other of which is connected to some other part of the instrument, such as one of the supporting members, which bears a fixed relation to the case when the latter occupies its normal position, but which is displaced with respect to the case when the latter is turned about the rotor by relative movement between the inner and outer frames due to changes in course of the craft or during meridian seeking movements of the gyroscopic element.

When the gyroscopic element occupies its normal position with respect to the points of the compass, that is, when it has settled upon the meridian, relative movement between the frames due to changes in course of the craft will tend to turn the case about the rotor and displace the parts of the contact mechanism with respect to each other. This will cause the driving motor to turn the inner frame and the case in a direction opposite to that in which these members will tend to be turned by the movement of the craft. This reverse movement will continue until the parts of the contact mechanism are brought back to their normal relation, thereby stopping the actuation of the motor.

This sequence of operations will be repeated continually so long as the course of the craft is changing, with the result that the driving motor will always maintain the case and the inner frame in a definite relation to the rotating mass, while the outer frame will move with the craft relatively thereto. By providing the inner frame with a compass card and the outer frame with a lubber's line, the instrument will give a continuous indication of the course of the craft.

On account of the inclined position of the gyroscopic element the degrees of freedom about both of its supporting axes may be suppressed by making the element pendulous about the axes so that the effect upon the element of changes in course or speed of the craft upon which the compass is carried may be automatically taken care of. When the craft is at rest the pendulousness of the element will cause it to assume a certain inclination to the surface of the earth. As the craft begins to move its acceleration will cause a torque to be applied to the element about an axis lying in its plane and in a plane perpendicular to the plane of the great circle along which the craft is passing, which will cause the element to precess about an axis at right angles thereto, i. e., an axis lying in the plane of the element and in the plane of the great circle. The pendulousness of the element will then produce a torque about the precession axis which will cause precession about the axis about which a torque was first applied. By properly proportioning the parts the element may be made to precess about an axis lying in a plane perpendicular to the plane of the great circle along which the craft is passing at an angular velocity equal to that of the craft and in the same direction. The gyroscopic element will thus follow the movement of the craft as its speed increases, and when the speed has become constant the element will assume such a position as to cause the necessary precession to maintain its inclination constant as the craft travels over the surface of the earth.

In order to prevent errors in the indications of the instrument due to the effect upon the gyroscopic element of the movement of the craft, the part of the contact mechanism which is carried upon one of the members for supporting the gyroscopic element is arranged to be shifted in accordance with the amount by which the part of the mechanism, which is associated with the case would be shifted as a result of the precession caused by the pendulousness of the element as explained above. The driving motor is therefore prevented from being energized and there is no displacement of the compass card element from its normal position. The mechanism for shifting the contacts to produce compensation for the effect upon the gyroscopic element of the movement of the craft may be manually or automatically operated in accordance with the factors upon which the effects depend as will more clearly appear hereinafter.

Since the case is arranged to turn freely about the rotor there will be no danger of injury to the parts of the instrument if the driving motor fails to perform its function in keeping the inner frame and case in their normal position with respect to the rotor. As the craft turns, these parts will simply be carried around the rotor and may be easily restored to normal position when the motor has again been started into operation. There is thus no danger of the instrument being injured, even if the gyroscopic rotor is not stopped when the motor fails.

Various arrangements may be employed for damping the oscillations about the meridian of the gyroscopic element of the instrument. One arrangement for this purpose consists of a mass which is attached to the case in the manner of a pendulum with its axis of oscillation disposed at an angle to the plane of the meridian, whereby a component of its weight acts about the supporting axis of the element which lies in the plane of the meridian to reduce the deviation of the element from its normal inclination as it seeks the meridian and thereby damp its oscillations. Another arrangement that may be employed consists of a pair of liquid containing reservoirs mounted on the element in the north-south plane and connected by a restricted passage.

Figure 10:
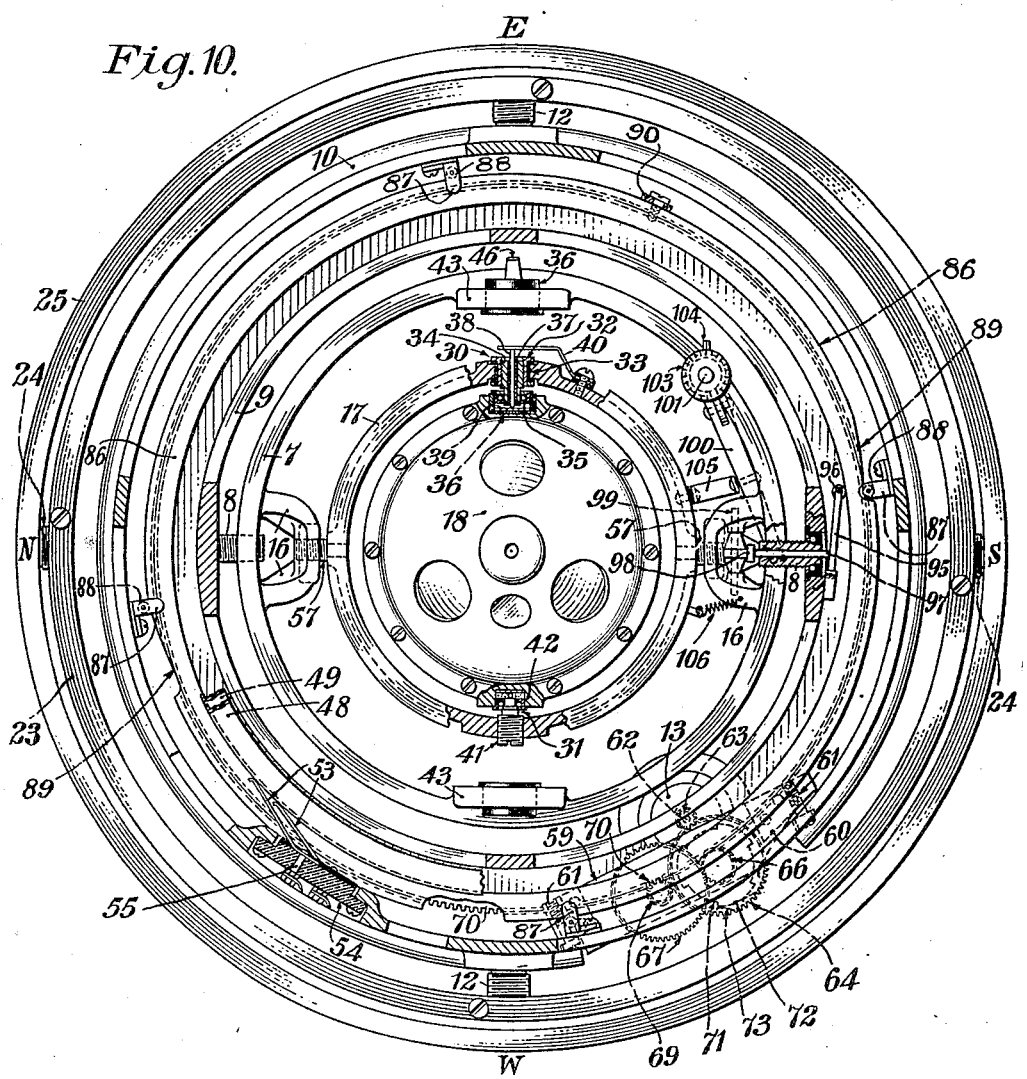
Figure 11:
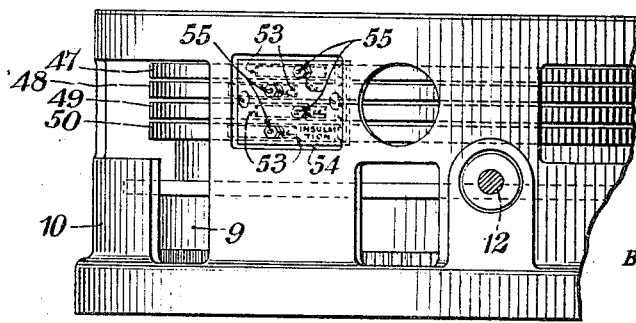
Figure 12:
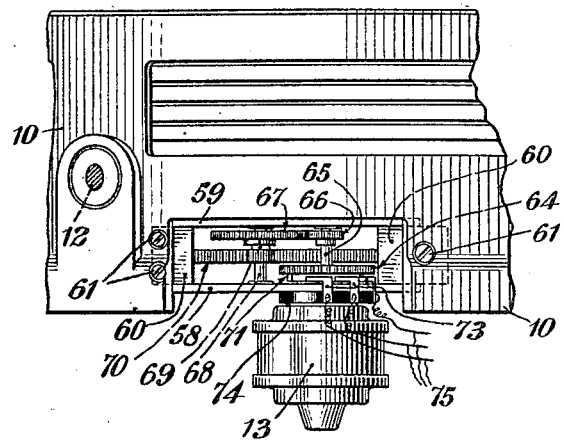
Figure 13:
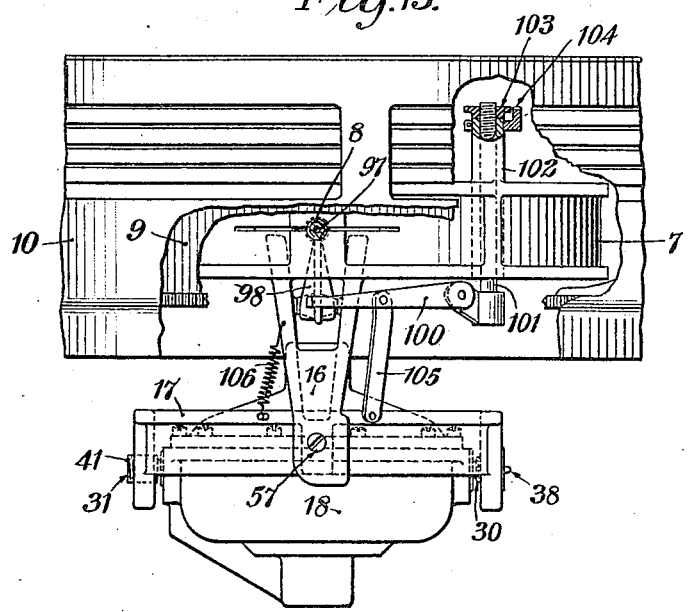

The particular nature of the invention as well as other objects and advantages thereof will appear more clearly from a description of the apparatus shown in the accompanying drawings in which Fig. 1 is a plan view with parts omitted for the sake of clearness of a simple form of compass without damping mechanism and showing the relation of the parts when the craft upon which it is mounted is heading north, Fig. 2 is a simplified elevation, partly in section, of the instrument of Fig. 1 viewed from the west, Fig. 3 is a plan view similar to Fig. 1, but with certain parts omitted, showing an arrangement for damping the oscillations of the compass, Fig. 4 is an elevation similar to that of Fig. 2, of the form of instrument shown in Fig. 3, Figs. 5 and 6 are vector diagrams relating to the damping arrangement shown in Figs. 3 and 4, Fig. 7 represents the paths traced out by the north-south axis of undamped and damped forms of compasses, Fig. 8 is a plan view similar to Fig. 1 of a preferred embodiment of the invention with the binnacle case omitted, Fig. 9 is an elevational view of the entire instrument principally in section along the line 9—9 of Fig. 8, Fig. 10 is a plan view, partly in section and with the main gyroscope removed, Fig. 11 is an elevation of the north west portion of the compass as seen from within the gimbal rings of the binnacle, Fig. 12 is an elevation of the south west portion of the instrument showing the servo motor and the transmitter for actuating repeater compasses, Fig. 13 is an elevation of a portion of the south side of the instrument showing the correcting mechanism, Fig. 14 is a simplified diagram of the circuit connections of the instrument, Fig. 15 is a simplified plan of a gyroscopic element having another damping arrangement applied thereto, Fig. 16 is an elevation of the element shown in Fig. 15, and Fig. 17 is an elevational view of one of the trunnions of the gyroscope.

The general structure of the instrument and its principle of operation will first be described with the aid of the diagrams, Figs. 1 to 7, after which a preferred embodiment of the invention will be described in detail.

Referring particularly to Figs. 1 and 2, the instrument comprises a gyroscopic rotor 1 of any suitable construction, the axis 2 of which is mounted in upper and lower bearings of a case 3 surrounding the rotor and provided with ventilation apertures as indicated in Fig. 1. The case 3 is provided with trunnions 4, 4 mounted in bearings in an inner ring 5 which, in turn, is provided with trunnions 6, 6 mounted in bearings in a second ring 7 which, on account of its function, will be hereinafter referred to as the stabilized ring of the instrument. The gyroscopic element and its supporting ring 5 are mounted in an inclined position as shown most clearly in the elevational view Fig. 2, by displacing the axis 6—6 from the center of gravity, C. G., of the element so that the element is pendulous and maintains an inclination $\alpha$ to the surface of the earth when the rotor is not spinning. This angle will be constant for all positions of the compass.

When the rotor is spinning the inclination of the element will differ from its inclination when the rotor is at rest by an angle $\alpha_L$ which depends upon the latitude and an angle $\alpha_S$ which depends upon the east-west component of the speed of the craft upon which the compass is carried, as will hereinafter be explained. The normal inclination of the element with the rotor spinning may therefore be denoted by $\alpha \pm \alpha_L \pm \alpha_S$.

The stabilized ring 7 is provided with trunnions 8, 8 disposed at right angles to the trunnion axis 6—6 and in the plane of the trunnion axis 4—4. The trunnions 8, 8 are mounted in bearings in an inner frame or shell 9 adapted to be power driven and bearing a scale graduated in units of angular measure. This frame is rotatably mounted within an outer frame or shell 10 as by means of balls 11. The frame 10 bears the lubber's line of the compass and is provided with trunnions 12, 12 adapted to fit in bearings in the gimbal rings of the binnacle, which have been omitted from the diagram for the sake of simplicity.

The element 9 is adapted to be driven by a servo motor 13 in any suitable manner, as by means of a pinion meshing with a gear attached to the element. The circuit of the servo motor is controlled by a device consisting of a contact 14 mounted on the case and adapted to engage one or the other of two contacts 15 mounted upon the ring 5 to cause the servo motor to rotate in one direction or the other. For simplicity the circuit connections between the device and the motor have been omitted.

The stabilized ring 7 is provided with a pair of depending brackets 16 disposed in the north-south plane and carrying at their lower ends a ring 17, within which is mounted a stabilizing gyroscope 18 having its rotor axis substantially vertical. Connected to the ring 17 is a member 19 which at its other end is attached to an adjusting device 20 mounted on the stabilized ring 7, whereby the planes of the rings may be adjusted relatively to each other.

In considering the operation of the instrument described above it will be assumed that the rotor 1 of the main gyroscope is turning clockwise as indicated by the arrows appearing at the ventilating apertures in Fig. 1. It will also be assumed that the contact 14 occupies its neutral position with respect to the two cooperating contacts 15 so that the servo motor 13 is not energized. It will be most convenient to regard the element 9 as having been turned in a clockwise direction through 90° from the position shown in Fig. 1 so that the axes 4—4 and 8—8 lie in an east-west direction with the high side of the gyroscopic element toward the east.

In accordance with the principle of the gyroscope the plane of rotation of the rotor 1 will remain fixed in space. As the earth turns from under the rotor due to its rotation, the high side of the rotor will rise relatively to the surface of the earth carrying the case with it. This will cause the pendulous mass of the rotor and case to be shifted from its position of equilibrium, or, in other words, the center of gravity, C. G., of the gyroscopic element may be regarded as having been displaced toward the east from its normal position. This displacement will produce a torque about the horizontal supporting axis 6—6 which will cause the rotor and case to precess about the inclined axis 4—4, thus displacing their plane with respect to the plane of the inclined ring 5. Under the conditions assumed herein, the north side of the case will move up and the south side will move down, so that the contact 14 will be shifted from its neutral position with respect to the contacts 15 into engagement only with the contact lying toward the south, thereby energizing the servo motor 13 to rotate in a direction to turn the power driven element 9 counterclockwise to carry the axes 4—4 and 8—8 toward the meridian. As the movable parts of the instrument turn toward the meridian the inclination of the gyroscopic element will gradually increase as the earth continues to turn away from under it, thus increasing the torque about the axis 6—6. The rotor and case will therefore precess about the axis 4—4 at an increasing rate, and the contacts 14 and 15 will keep the servo motor 13 energized and the element 9 in motion. The axes 4—4 and 8—8 will thus be carried past the meridian and toward the west. This westerly movement will continue until the contact 14 again assumes its neutral position with respect to the contacts 15 to de-energize the servo motor 13. This will not occur until precession about the axis 4—4 has ceased due to the absence of torque about the axis 6—6. This last named condition will obtain when the parts of the instrument have turned so far toward the west that the gyroscopic element lies at its normal inclination $\alpha \pm \alpha_L \pm \alpha_S$ with respect to the surface of the earth due to the fact that in the new position of the element the earth is turning toward the plane of the rotor instead of away from it as at the beginning of the cycle of operations described above.

During the movement of the parts from east to west there will be a relative movement of the case with respect to the rotor about the axis 2 of the latter entirely apart from the rotation of the rotor within the case. In other words, during meridian seeking oscillations, the case 3 will turn in the plane of the rotor about the axis 2 common to it and the rotor, while the rotor is spinning about this same axis. At the same time that the case is turning about the rotor axis 2 it is also precessing about its trunnion axis 4—4. The resultant movement of the case due to the movement imparted to it by the servo motor and that due to precession will be about a vertical axis passing through the intersection of the axes 4—4 and 6—6.

After the gyroscopic element has reached the western limit of its oscillation, the movement of the earth toward it will result in a depression of its high side relatively to the surface of the earth due to the fixity of the plane of rotation of the rotor. This depression of the high side of the element will result in shifting its center of gravity, C. G., toward the east from its normal position, thus producing about the horizontal axis 6—6 a torque which will be in the opposite direction to that produced when the element was at its eastern limit of oscillation. This torque will cause precession of the rotor and case about the axis 4—4 in such a direction as to elevate the north side of the case and depress the south side relatively to the inclined ring 5. As a result of this precession the contact 14 will be shifted from its neutral position with respect to the contacts 15 into engagement only with the one lying toward the south, thus energizing the servo motor 13 to turn the power driven element 9 in a clockwise direction thereby swinging the axes 4—4 and 8—8 across the meridian toward the east. As the parts move from the west toward the meridian the inclination of the gyroscopic element with respect to the surface of the earth will continue to decrease since the earth is turning toward the element. The torque about the axis 6—6 due to the shifting of the center of gravity of the element will thus be increased, as will also the precession of the rotor and case about the axis 4—4. The instrument will cross the meridian from west to east with the axis 4—4 depressed as far below its normal inclination $\alpha \pm \alpha_L \pm \alpha_S$ as it was raised above this inclination when it crossed the meridian from east to west.

During the west to east movement the case will turn about the rotor axis 2 in the opposite direction to that in which it turns during the movement from east to west, and the case will also have a movement of precession about the axis 4—4 in the opposite direction. The resultant movement of the case will be about a vertical axis through the intersection of the axes 4—4 and 6—6, but in the opposite direction to that in which it turned during the east to west oscillation.

If the gyroscopic element be unaffected by any other external forces its oscillations will gradually diminish in amplitude due to friction, and it will ultimately reach a settling point with its axis 4—4 lying in the plane of the meridian and at an angle $\alpha \pm \alpha_L \pm \alpha_S$ to the surface of the earth. The angle $\alpha_L$ represents the difference between the inclination $\alpha$ when the rotor is at rest and the inclination for the particular latitude of the compass when its rotor is spinning. This angle is such that the pendulousness of the element will maintain a torque about the axis 6—6 to cause the element to precess about the axis 4—4 at an angular velocity equal to the component of the angular velocity of the earth about an axis parallel to the axis 4—4, whereby the element follows the movement of the earth about its axis. In order that the element may follow the movement of the craft over the earth's surface, its inclination will be subject to a further variation, represented by $\alpha_S$, in accordance with the east-west component of the speed of the craft as will more clearly appear hereinafter.

If the course of the craft be changed the resulting movement in azimuth of the outer shell or element 10 will tend to carry along the inner shell or element 9 and the rings 7 and 5 mounted thereon. As the ring 5 moves it will turn the case 3 about the inclined axis 2 of the rotor and will itself be slightly tilted about the axis 4—4 from its normal position with respect to the plane of the case due to the fact that the trunnions 6, 6 by which it is connected to the stabilized ring 7 move in a horizontal plane while the case moves in an inclined plane. This change in the relative position of the case 3 and ring 5 will cause a displacement of the contacts 14 and 15 from their neutral position with respect to each other, in a direction to cause the servo motor 13 to be energized to turn the element 9 in the reverse direction to that in which it tends to turn by the movement imparted to the surrounding element 10 by the change in course of the craft. This reverse movement of the element 9 will turn the ring 5 and case 3 until the contacts 14 and 15 are brought back to their neutral position with respect to each other. The instrument will operate in the manner described above whenever there is any yaw of the craft. The servo motor will always maintain the compass card in its true position with respect to the points of the compass, while the element 10 which bears the lubber's line will turn about the interior parts of the instrument in accordance with the movement of the craft. If, for any reason, the servo motor should fail to function, the element 9, rings 7 and 5, and case 3 will continue with the element 10 instead of being brought back to their normal position by the motor. The case will simply turn freely about the rotor axis 2 with corresponding changes in inclination of the ring 5 until the parts have been restored to operative condition, but there will be no danger of the instrument being injured in any way.

In the instrument shown in the drawings the gyroscopic element is inclined at substantially 30° to the surface of the earth. The axis 4—4 will bear, therefore, a different angular relation to the earth's axis at different latitudes, being perpendicular thereto at about 60° south latitude and parallel thereto at about 30° north latitude. When the axis 4—4 is perpendicular to the axis of the earth, the spinning axis 2—2 is parallel thereto, and the element will follow the movement of the earth without any precession about the axis 4—4, because the element is moving in its own plane of rotation. The maximum precession will occur when the rotor axis is perpendicular to the earth's axis, that is, at about 30° north latitude.

The rate of precession about the axis 4—4 will therefore vary according to latitude. Since this precession is produced by a torque about the axis 6—6, the torque must vary with latitude in the same manner as the precession varies, being of maximum magnitude when the axis 4—4 is parallel to the axis of the earth, as at 30° north latitude, and of zero magnitude when the axis 4—4 is perpendicular thereto, as at 60° south latitude. In order that the required torque may be produced to cause the necessary precession about the axis 4—4, the gyroscopic element will assume different angular positions about the east-west axis 6—6 to shift its center of gravity in accordance with the torque which should be applied about this axis. In other words, the varying degrees of torque are produced by variations in the angle $\alpha_L$ which represents the deviation of the gyroscopic element when the rotor is spinning from the inclination $\alpha$ which the element assumes when the rotor is at rest, due to the position of the compass on the earth's surface.

Since at 60° south latitude no precession about the axis 4—4 will be required to cause the element to follow the movement of the earth, because the element moves in its own plane of rotation, there will be no torque about the axis 6—6 except such as may be due to the movement of the craft, and the inclination of the element will be equal to $\alpha \pm \alpha_S$, $\alpha_L$ being zero. At 30° north latitude $a_L$ will have its greatest positive value, because at this latitude the maximum torque must be applied about the axis 6—6 to produce the precession about the axis 4—4 necessary to cause the element to follow the movement of the earth. At south latitudes higher than 60° the angle $a_L$ will be negative. The inclination of the element will vary, therefore, according to latitude, within certain limits depending upon the characteristics of the instrument, but the variation will be small as compared with the total inclination to the surface of the earth, so that the gyroscopic element may be regarded as maintaining a substantially constant inclination to the surface of the earth regardless of the position of the instrument upon the earth.

A simple form of compass such as has been described above will, however, require such a long time to settle on the meridian that it would be unsuited for use even on land unless means were provided for damping its oscillations. If, on the other hand, the compass be used on ship board, as would be the usual case, the impulses due to rolling of the ship and other causes may be sufficient to cause an instrument of the simple form to oscillate indefinitely so that it would never settle upon the meridian. It is therefore essential that means be provided for damping the oscillations, in order that the instrument may be used for navigational purposes.

One damping arrangement that may be employed is shown in Figs. 3 and 4 in which the parts of the compass are designated by the same reference characters as in Figs. 1 and 2, but some of them have been omitted for the sake of simplicity. A mass 21 is suspended from the case 3 by means of a bail or the like pivotally attached to the case at points 22, 22 on an axis lying at an angle $\beta$ to the axis 4—4 of the case. The equilibrium position of the gyroscopic element, including the mass 21, when it occupies its normal inclination $a \pm a_L \pm a_S$ to the surface of the earth is shown in full lines in Fig. 4. Assuming, as in the first description of the operation of the instrument, that it starts from an east position, the inclination of the element will be increased from angle $a \pm a_L \pm a_S$ by an angle $a'$ as the earth turns from under it, thus shifting the parts into the position shown in broken lines in Fig. 4, it being understood that in these simple figures of the apparatus and in the accompanying diagrams relative displacements between parts of the instrument under different conditions are greatly exaggerated for clearness of disclosure.

As the tilt of the gyroscopic element about the axis 6—6 increases the mass 21 will be shifted from its normal equilibrium beneath the case. The effect upon the element of this displacement of the mass will appear most clearly in connection with the vector diagrams, Figs. 5 and 6. Let $a b$ represent the movement of the element about the axis 6—6 as its inclination increases from angle $a \pm a_L \pm a_S$ to angle $a \pm a_L \pm a_S' + a'$. This movement may be resolved into two components, one $a c$ about an axis perpendicular to the axis 22—22 of the mass 21, and another $c b$ about the axis 22—22. Since the mass is suspended freely from the case the last named component does not represent any movement of the mass but the component $a c$ represents a movement of the mass with the case due to the lifting of the north-west bearing of the bail and the lowering of its south-east bearing.

The component $a c$ may be resolved into two components $a d$ and $d c$, as shown in Fig. 6. The component $d c$ represents movement of the mass 21 about the supporting axis 6—6, but this will merely add to the pendulousness of the gyroscopic element and increase its meridian seeking properties. The component $a d$ represents the movement of the mass 21 about the supporting axis 4—4. The effect of this movement will be to apply a torque about this axis which will cause precession about the axis 6—6, thus depressing the high side of the gyroscopic element and elevating the lower side. The inclination of the element is therefore reduced below that which exists in the undamped form of instrument shown in Figs. 1 and 2, so that the axis 4—4 crosses the meridian at an angle intermediate between $a \pm a_L \pm a_S + a'$ and $a \pm a_L \pm a_S$ as the element swings from east to west. The amplitude of the oscillation towards the west is therefore reduced, and as the element swings back across the meridian from west to east the mass 21 will act to still further lessen the deviation of the axis from its normal inclination as compared with the undamped instrument. The inclination of the axis thus rapidly approaches its normal value during subsequent oscillations and finally settles in the plane of the meridian at the normal inclination.

The characteristic curves of the two forms of compass are shown in Fig. 7 in which the path traced out by the axis 4—4 of the undamped instrument of Figs. 1 and 2 as viewed from the north is represented by the ellipse A plotted with respect to coordinate axes in which the ordinates represent inclination and the abscissæ displacement in azimuth. The major axis $e f$ of the ellipse corresponds to the normal inclination $a \pm a_L \pm a_S$ of the sensitive element, while, the minor axis $g h$ corresponds to the meridian.

The curve B represents the path traced out by the axis 4—4 of the damped instrument of Fig. 3, showing the manner in which the inclination and displacement of the axis diminishes rapidly until it reaches its settling point C upon the meridian at normal inclination $\alpha \pm \alpha_L \pm \alpha_S$. Since the component of movement about the axis 4—4 is greater than the component about the axis 6—6 the tangent of the curve at the points of intersection with the ordinate $g\ h$ will lie at an angle thereto depending upon the relative magnitude of the components. At the points where the curve intersects the axis $e\ f$ the component of movement about the axis 4—4 is zero and the tangent of the curve therefore lies normal to this axis at these points.

The effects upon the instrument of the movement of the craft upon which it is carried may be divided into two general classes, those due to rolling and pitching of the craft and those due to the movement of the craft over the surface of the earth.

In the present instrument the effect of rolling and pitching is overcome by the stabilizing gyroscope 18 which is mounted to spin about a vertical axis and stabilizes the ring 7 about its supporting axis 8—8 thus maintaining the supporting axis 6—6 in fixed relation to the surface of the earth, except as it may be shifted for corrections in a manner to be described, to prevent the contacts 15 carried upon the ring 5 from being displaced with respect to the contact 14 carried upon the case 3. Thus the contacts occupy their neutral position in spite of oscillatory motion of the craft so that the servo motor 13 is not affected and there is no periodic displacement of the element 9, as would otherwise be the case if the contacts 15 were affected by such motion, and moved back and forth with respect to contact 14.

In considering the effect upon the compass of the movement of the craft over the surface of the earth let it be assumed that the speed of the craft is increasing from one constant value to another. The effect of the acceleration upon the pendulous gyroscopic element will cause a torque about an axis lying in the plane of the element and in a plane perpendicular to the plane of the great circle along which the craft is passing. This torque will cause precession about an axis at right angles to the first named axis which will shift the center of gravity of the element and thus cause a torque about the precession axis. This last named torque will cause precession about an axis at right angles to the precession axis, i. e., about the axis about which a torque was first applied. The gyroscopic element will be so constructed that the angular velocity of precession about the last named axis will be equal to the angular velocity of the craft and in the same direction.

The gyroscopic element will thus follow the movement of the craft as its speed increases, but when the craft has attained its new constant speed the inclination of the element about an axis lying in the plane of the great circle along which the craft is moving will differ from that assumed by the element at the original speed by an amount sufficient to produce the torque necessary to cause the precession required to keep the element at constant inclination with respect to the surface of the earth as the craft moves over this surface.

The torque applied about an axis lying in a plane perpendicular to the plane of the great circle along which the craft is moving may be resolved into two components, one about the axis 4—4 and the other about the axis 6—6. The resulting precession may likewise be resolved into components about these axes.

The torque component about the axis 4—4 represents the torque corresponding to the east-west component of the acceleration of the craft, and because of it the gyroscopic element will assume an inclination about the axis 6—6 differing from its inclination $\alpha \pm \alpha_L$ by an angle $\alpha_S$ which will vary in accordance with the east-west component of the speed of the craft.

If the craft is heading due east or west $\alpha_S$ will have its maximum value since the torque will be applied entirely about the axis 4—4, and the tilt of the element resulting therefrom will be entirely about the axis 6—6. If the craft be heading due north or south there will be no torque about the axis 4—4 and therefore no tilt about the axis 6—6 due to the movement of the craft. $\alpha_S$ will then be zero, and the inclination of the element about the axis 6—6 will be equal to $\alpha \pm \alpha_L$. For intercardinal courses there will be torque components about both axes 4—4 and 6—6, the relative magnitudes of which will depend upon the course of the craft. $\alpha_S$ will therefore vary in accordance with the sine of the heading of the craft.

It has been explained that the angle $\alpha_L$ will vary according to the latitude of the compass, being zero when the rotor axis and the earth's axis are parallel and a maximum when these axes are perpendicular to each other. For the form of compass shown herein the inclination I of the gyroscopic element about the axis 6—6 may therefore be represented by the equation $$I = \alpha \pm \alpha_M \sin(L + 90° - \alpha) - \alpha_K \sin H$$

in which $\alpha$ equals the inclination of the element when its rotor is at rest;

$\alpha_M$ equals the maximum value of $\alpha_L$ or its value when the rotor axis is perpendicular to the axis of the earth;

L equals the latitude;

$\alpha_K$ equals the maximum value of $\alpha_S$ for a given speed of the craft upon which the compass is carried, and H equals the heading of the craft.

Whenever there is a component of precession about the axis 4—4 there will be a corresponding movement of the contact 14 with respect to the contacts 15, but the component about the axis 6—6 will not affect the relative position of the contacts. In order that there may be no displacement between the contacts, which would energize the servo motor 13 to turn the element 9 from its true position with respect to the points of the compass and thus produce an error in the indications of the instrument, the contacts 15 may be shifted by an amount equal to that by which the contact 14 is shifted due to the component of precession about the axis 4—4.

The contacts 15 may be shifted most conveniently by tilting the stabilized ring 7 about its supporting axis 8—8 to tilt the ring 5, on which the contacts are mounted, about the axis 4—4. In the simple form of instrument shown in Figs. 1 and 2 this tilting may be effected by means of the adjusting device 20 connected to the ring 17 which is maintained in a fixed plane by the stabilizing gyroscope 18 mounted therein. A change in the length of the member 19 by manipulation of the device 20 will result therefore in a tilting of the ring 7 about its axis 8—8, thus shifting the contacts in one direction or the other from their normal position in accordance with the amount by which the contact 14 would be shifted due to the component of precession about the axis 4—4, this component depending upon the course and speed of the craft.

When the craft is moving east or west there is no component of precession about the axis 4—4, so that under these conditions the stabilized ring 7 should not be tilted about its axis 8—8 since the contacts 15 need not be shifted. The maximum tilting of the stabilized ring should take place when the craft is heading north or south. The adjusting device should therefore be arranged to tilt the ring 7 in proportion to the speed of the craft and the cosine of its heading. In the instrument to be hereinafter described means are provided for automatically applying the course correction, but for the purpose of illustrating the principle of operation a manual adjustment has been shown in the simplified diagrams.

If the speed of the craft be changed, while maintaining the same course, the torque produced by the pendulousness of the element about an axis lying in a plane perpendicular to the plane of the great circle along which the craft is passing will vary accordingly, as will also the precession caused by the torque. If this precession has a component about the axis 4—4, the component will vary also, and thus alter the movement of the contact 14 with respect to the contacts 15. In order to prevent the servo motor 13 from being energized the stabilized ring 7 may be shifted by means of the adjusting device 20 to bring the contacts 15 into a new neutral position with respect to the contact 14, this new position being that corresponding to the new speed of the craft, so that there will be no deviation of the compass at this speed.

So far as the component of precession about the axis 6—6 is concerned it will merely shift the center of gravity of the element in the vertical plane of the axis 4—4 without affecting the position of the contact 14 with respect to the contacts 15 so that no correction need be applied for this component.

In the manner described above the gyroscopic element will continue to follow the movement of the craft over the surface of the earth at the new speed, and there will be no deviation of the compass as a result of the acceleration or retardation of the craft. In other words, the arrangement of the parts of the instrument is such that under all conditions of change of speed the gyroscopic element will follow the motion of the craft over the surface of the earth, and by suitable shifting of the contacts 15 for each new speed all ballistic deflections due to such changes are avoided.

It has been explained above that the gyroscopic element is caused to follow the movement of the craft over the surface of the earth and maintain its normal inclination thereto by the shifting of the center of gravity of the element as a result of the precession caused by the torque about an axis lying in a plane perpendicular to the plane of the great circle along which the craft is travelling.

Were the servo motor energized by the shifting of the contact 14 due to the component of precession about the axis 4—4, the case would be turned about the rotor axis 2 until this contact had been restored to normal position with respect to contacts 15, that is, until precession about the axis 4—4 had ceased. The center of gravity of the case would then occupy its normal position below and in the vertical plane of the axis 4—4. The effect of the pendulousness of the element in producing a component torque about the axis 4—4 would therefore be overcome, and there would be no component about the axis 6—6 of the precession which causes the gyroscopic element to follow the movement of the craft over the earth's surface. The deviation of the element from its normal inclination would then be increased as the craft moves, and the resulting torque due to the pendulousness of the element would again cause precession about an axis at right angles to that about which the torque is applied. The component about the axis 4—4 of this precession would shift the contact 14 to again energize the servo motor to turn the inner frame 9 and the parts mounted thereon until the contacts were restored to their normal relation.

The effect of the actions described above would be to produce a still further error in the indications of the instrument unless this effect were compensated for. Such compensation may be obtained by suitably tilting the stabilized ring 7 to shift the contacts 15, in the manner previously described, to prevent the servo motor from being energized and annulling the effect of the pendulousness of the gyroscopic element in causing it to follow the movement of the craft over the surface of the earth.

It has been explained that the simple form of instrument shown in Figs. 1 and 2 automatically takes care of changes in latitude, but when the damping arrangement shown in Figs. 3 and 4 is employed a latitude correction is required for the following reason. Changes in inclination of the gyroscope element due to changes in latitude of the craft upon which the compass is carried will be accompanied by corresponding changes in the position of the mass 21. Since this mass is mounted to swing about an axis lying at an angle to the north-south axis 4—4 of the gyroscopic element, such changes in inclination of the element would cause the mass to be displaced slightly to one side or the other of the vertical plane of the axis 4—4, thus producing a torque about this axis. The element would thus be caused to precess about the axis 6—6, thereby producing further changes in the inclination of the element and altering the precession about the axis 4—4 so that it would not correspond exactly to that which should take place at the particular latitude. These effects, although slight, would produce a change in the position of the gyroscopic element as compared with the position which it should normally occupy at the particular latitude, with the result that the compass would have a settling point displaced slightly from its true position with respect to the meridian, and an error would be introduced in its readings.

In order to correct for the effect of the displacement of the mass 21 due to changes in latitude the stabilized ring 7 may be shifted to raise one or the other of the trunnions 6, 6 to displace the center of gravity of the case from its normal position below the axis 4—4 to the east or west enough to produce a torque about this axis equal and opposite to that produced by the displacement of the mass 21, due to changes in inclination of the sensitive element. The sensitive element thus maintains its normal position with respect to the meridian irrespective of changes in latitude and the presence of the mass 21.

A complete gyroscopic compass embodying the invention is shown in Figs. 8 to 14 inclusive and 17, in which the elements of the instrument corresponding to those shown in the simplified diagrams of Figs. 1 to 4 inclusive are designated by similar reference characters. In the complete instrument the trunnions 12, 12 are attached to an inner gimbal ring 23 and extend into suitable bearings in the outer shell 10, instead of being attached to the shell and adapted to extend into bearings in a gimbal ring as shown in the simplified diagram of Fig. 1. The inner gimbal ring 23 is provided with trunnions 24, 24 disposed at right angles to the trunnions 12, 12 and extending into suitable bearings in an outer gimbal ring 25 which is supported, as by means of springs 26 from the upper edge of the binnacle bowl 27. The binnacle is provided with a suitable transparent cover through which the compass card 28 carried on the inner shell 9 and the lubber's line 29 on the outer shell 10 may be seen.

In the simple form of instrument shown in Figs. 1 to 4 the case 3 is shown supported upon the ring 5 by the simple trunnions 4, 4 but in the complete instrument these trunnions are utilized for conducting the current to the stator of the main gyroscope 1 and therefore are not of the simple construction shown in the diagrammatic figures. The same general construction of trunnions may be used for conveying the current between the stabilized ring 7 and the inclined ring 5 and also between the ring 17 and the stabilizing gyroscope 18 mounted thereon. In order not to complicate the drawing only one set of such conducting trunnions has been shown, and for convenience the trunnions of the stabilizing gyroscope have been selected for this purpose. It will be understood that the other trunnions through which the circuits pass are of substantially the same construction except as may be noted hereinafter.

It is intended that both of the gyroscopes of the instrument shall be operated by three phase current and accordingly one of the trunnions, such as 30 (see Fig. 10), is utilized for two of the conductors of a three phase system, while the other trunnion 31 is utilized for the third conductor of the system and is grounded as indicated in the wiring diagram Fig. 14. The trunnions may be of any suitable construction adapted to serve this purpose. By way of illustration the trunnion 30 is shown herein as consisting of a member 32 mounted within an aperture in the ring 17 and insulated therefrom by a collar 33 of suitable material. Screwed within the member 32 is a trunnion 34 which extends into a ball bearing 35 placed in a recess in the case of the gyroscope 18, but insulated therefrom in any suitable manner as by being mounted within an annular member 36 of insulating material. The trunnion 34 is provided with a longitudinal bore lined with insulating material 37 and containing a pin 38, the inner end of which is held in engagement with a plate 39 set within the insulated member 36 of the bearing, by means of a spring finger 40 attached to, but insulated from, the ring 17.

It is intended that one of the conductors of the three phase system shall be connected to the spring 40 so that the current will pass through this spring and the pin 38 to the plate 39 from which a lead may be carried in any convenient manner to one set of coils of the stator of the gyroscope. Another one of the conductors of the three phase system is electrically connected in any suitable manner to the member 32 so that the current passes from this member through trunnion 34 and the balls of the bearing 35 to the raceway of the balls from which a lead may carry the current to another set of coils of the stator.

The grounded bearing 31 consists of a trunnion 41 screw threaded in the ring 17 to permit adjustment. The inner end of the trunnion extends into a suitable ball bearing 42 mounted within a recess in the case of the gyroscope. The third set of coils of the stator of the gyroscope is connected to the raceway of the ball bearing 42 so that current may pass through the balls of the trunnion 41 to the ring 17 which is grounded with the other parts of the instrument.

The upper bearing 4 of the case 3 of the main gyroscope is of substantially the same construction as is the trunnion 30 of the stabilizing gyroscope, and the parts which appear in Figs. 8 and 9 have been designated by the same reference characters as used in connection with the description of the trunnion 30. The upper trunnion 4 differs in one respect from the construction shown in Fig. 10 in that the trunnion member 34 is mounted eccentrically within the member 32 in order that a fine adjustment of the upper end of the trunnion axis 4—4 of the case may be obtained by turning the member 32 within the aperture in which it is mounted in the ring 5, as shown most clearly in Fig. 17.

The lower end of the axis 4—4 of the case is formed by a trunnion of substantially the same construction as the trunnion 31 of Fig. 10, but which in addition performs the function of a thrust bearing on account of the inclined position of the main gyroscope.

The gyroscopic rotor and case and the ring 5 are pivotally mounted by the trunnions 6—6 between upstanding lugs or ears 43 projecting from the top of the stabilized ring 7 as shown most clearly in Fig. 9. To provide for the conduction of current between the ring 7 and the ring 5, one of the trunnions 6, the east trunnion as shown in the drawing, is constructed in substantially the same manner as is the trunnion 30 of Fig. 10. The parts, which in Fig. 10 are shown mounted upon the ring 17, are, in the trunnion 6, mounted upon the ring 5, while the insulating member 36 and the ball bearing therein are mounted upon the ring 7. In order to provide a ground connection between the ring 5 and the ring 7 there is attached to the former a bracket 44 passing over the top of the ear 43 and provided at its free end with a contact point 45 lying in line with the trunnion axis 6—6. Co-operating with the contact point 45 is a bracket 46 attached to the outer face of the stabilized ring 7 at a point below the trunnion. The brackets 44 and 46 are of spring material so as to maintain a good electrical connection between them.

Flexible leads or pigtails may be connected to the terminals of the east trunnion 6, that are associated with the stabilized ring since this ring will not be affected by the resiliency of such leads. The other ends of the leads are connected to rings 47 and 50 of a series of slip rings 47 to 50 inclusive which surround the inner frame or shell 9 and are attached to the lower side of an outwardly projecting ledge or shoulder 51 at the top of this shell by means of screws passing through insulating spaces 52, (see Fig. 9). These slip rings are to take care of the relative movement between the inner shell 9 to which they are attached and the outer shell 10 which partakes of the movement of the craft. For the purpose of conducting current to the slip rings there is provided for each ring a brush 53, all of the brushes being attached to an insulating base 54 which is mounted in a suitable aperture in the outer shell 10 as shown most clearly in Figs. 10 and 11. The spring fingers are provided with binding posts 55 from which leads may be carried to the external circuit.

The trunnions 8, 8 of the stabilized ring 7 are screw threaded through the ring to provide for adjustment and extend into suitable ball bearings 56 in the inner shell 9 as shown most clearly in Fig. 9. The brackets 16, 16 depending from the stabilized ring are arranged in the north south plane and may be of any convenient form. They are provided at their lower ends with trunnions 57 for supporting the ring 17 of the stabilizing gyroscope 18, the bearings of which have previously been described in connection with Fig. 10.

The servo motor 13 for turning the inner shell 9 and the parts mounted thereon may be of any suitable construction and is shown only in an external view in Figs. 10 and 12. For the purpose of supporting the motor and the gear connections between it and the inner shell there is provided a frame consisting of lower and upper plates 58 and 59 respectively, connected by blocks 60 which are attached to the inner face of the outer shell 10 by screws 61. The servo motor is carried by the lower plate 58 and its shaft 62 is provided with a pinion 63 meshing with a gear 64 attached to a shaft 65 mounted between the plates 58 and 59. The shaft 65 is provided with a pinion 66 meshing with a gear 67 on the upper end of a shaft 68 mounted between the plates 58 and 59. Also mounted upon the shaft 68 is a pinion 69 which engages a gear 70 attached to the bottom of the inner shell 9 as shown most clearly in Fig. 9.

The transmitter for controlling the actuation of repeater compasses may conveniently be operated from the gear train of the servo motor. It will be understood that any suitable form of transmitter may be used for this purpose. As shown herein a contact device 71 is attached to the lower face of the gear 64 and is provided with segmental projecting portions 72 as shown most clearly in Fig. 10 adapted to engage brushes 73 as the member 71 rotates. The brushes are mounted upon a plate 74 (Fig. 12) of insulating material attached to the bottom of the plate 58, and are provided with conductors 75 leading to the repeater compasses.

The contact mechanism for controlling the servo motor and which has been designated by reference numerals 14 and 15 in the simplified diagrams, may be of any suitable construction. As shown herein the part 14 of the mechanism is in the form of a trolley cooperating with the parts 15. A bracket 76 of resilient material is fastened to the upper face of the case 3 (see Fig. 9) and carries at its top a member 77 to one side of which is attached an upwardly extending bracket 78 carrying at its upper end a trolley wheel 79 adapted to roll over the cooperating parts 15 of the mechanism, which are mounted upon the inclined ring 5 by means of a resilient bracket 80. The portions 15 of the mechanism are constructed of suitable material to cooperate with the trolley wheel with a minimum amount of injury due to arcing, but these portions may be extended sidewise to serve as bearing surfaces for the trolley wheel in case the latter should be shifted beyond the parts particularly designed to cooperate therewith. The parts 15 are separated slightly from each other as indicated at 81, and each of them is provided with a terminal 82 to which a suitable lead may be connected.

In order to complete the circuit between the contacts 15 and a relatively fixed part of the instrument, which does not partake of the movement of ring 5, the west trunnion 6 of this ring may be utilized in a manner similar to that in which the east trunnion is utilized for the circuit of the gyroscope. For this purpose the west trunnion 6 is of substantially the same construction as the trunnion 30 of the stabilizing gyroscope described in connection with Fig. 10. There is, however, a difference in structure due to the fact that the reaction of the spring 40 associated with the east trunnion 6 tends to press the ring 5 toward the west, and therefore in the west trunnion 6 the spring 40 is omitted and the pin 38 is fixed with respect to the trunnion member 34 so as to be held in engagement with its cooperating conducting plate 39 by the effect of the spring 40 on the other side of the instrument. The leads from the terminals 82 of the contact mechanism may be carried along the ring 5 and connected to the two current conducting parts of the west trunnion 6, associated with the ring. From the parts of this same trunnion associated with the stabilized ring 7 flexible conductors or pigtails are carried to the intermediate slip rings 48 and 49, and through the brushes 53 coacting with these rings the circuit may be continued to the servo motor 13 by suitable leads.

As shown most clearly in Figs. 8 and 9 the case 3 is provided with a pair of brackets 83 between the outer ends of which is a screw 84 carrying a weight 85, the arrangement of parts being such that the weight is movable in a direction perpendicular to the axis 4—4 for the purpose of accurately balancing the gyroscope about this axis.

For the purpose of applying the necessary corrections for speed, heading and latitude of the craft upon which the compass is carried, there is provided a ring 86 which, as shown most clearly in Fig. 10, is mounted between four brackets 87 attached to the inner face of the outer shell 10 at substantially 90° apart. Each of the brackets is provided with a roller 88 which engages the periphery of the ring 86. At diametrically opposite points the ring 86 is cut away to provide depressed cam faces 89 which are arranged to cooperate with the rollers 88 of the north and south brackets 87, the arrangement being such that when the innermost part of one cam engages its cooperating roller the outermost part of the other cam is in engagement with its roller as shown most clearly in Fig. 10.

The cam ring 86 is adapted to be moved circumferentially in accordance with the speed of the craft and for this purpose an arm 90 is attached at its lower end to the cam ring and is pivotally mounted at an intermediate point to the outer shell 10 as at 91 (see Fig. 9). The upper end of the arm 90 is bent inwardly to form a pointer 92 cooperating with a scale 93 attached to the top of the outer shell 10 and graduated in units of speed (see Fig. 8). The arm may be provided with a knob 94 for convenience in manipulating it. Since under normal conditions the speed of the craft will not be changed frequently the correction for this quantity may be applied manually, although it will be understood that if desired the arm 90 can be connected to a suitable mechanism whereby it may be swung automatically in accordance with changes in speed of the craft.

As shown most clearly in Fig. 10 the south side of the inner shell 9 carries an arm 95 provided at its free end with a roller 96 engaging the inner edge of the cam ring 86. The corresponding trunnion 8 of the stabilized ring 7 is provided with a bore through which extends a plunger 97 having its outer end in engagement with the arm 95 and its inner end in engagement with the outer end of one arm of a bell crank lever 98 pivotally mounted between the two parts of the corresponding bracket 16 which is provided with suitable lugs to receive the pivot 99 of the lever. The other arm of the lever engages the free end of an arm 100 which, as shown most clearly in Fig. 13, is attached to the lower end of a rod 101 mounted in a guide 102 on the stabilized ring 7 and provided at its upper end with an adjusting nut 103 graduated in units of latitude and cooperating with a fixed member 104 which bears an index mark as shown most clearly in Fig. 10.

Attached to an intermediate point of the arm 100 is a link 105, the other end of which is connected to the top of the ring 17 within which the stabilizing gyroscope 18 is mounted. On the opposite side of the supporting bracket 16 is a spring 106 connected between the bracket and the ring 17. The arrangement is such that the spring 106 tends to turn the ring 17 about its trunnions 57 and through the link 105 hold the free end of the arm 100 in engagement with the end of the horizontal arm of the bell crank lever 98 and through the latter push the pin 97 against the arm 95 to hold the roller 96 firmly in contact with the inner edge of the cam ring 86, thus preventing any lost motion between the elements of the correcting mechanism.

A diagram of the complete circuit connections of the instrument is shown in Fig. 14 in which 107, 108 and 109 represent the mains of a three phase system, the main 109 being grounded. Current is supplied from the nongrounded mains 107 and 108 to the slip rings 47 and 50 through the brushes 53′ and 53″ which are connected to the mains by leads 110 and 111 respectively. Connected to the slip rings 47 and 50 are conductors 112 and 113 respectively, which are carried to the stabilized ring 7, preferably in the neighborhood of one of its trunnions 8, and then branched into a pair of conductors 114 which are carried along the stabilized ring to the terminals of the conducting trunnion 6 at the east side of the instrument. From the other terminals of the part of this trunnion associated with the inclined ring 5 a pair of leads 115 is carried along the ring to the terminals of the conducting trunnion 4 at the north side of the case 3. The terminals of the trunnion bearing which is carried upon the case are connected by leads 116 and 117 to two of the terminals of the three phase windings 118 of the stator of the main gyroscope. The third terminal of the windings is grounded through the trunnion 4 at the south side of the case, the ring 5, springs 44 and 46, the ring 7 and the outer parts of the instrument.

For the purpose of supplying current to the stabilizing gyroscope 18 a branch pair of leads 119 is connected to the leads 112 and 113 and carried along one of the brackets 16 and around the ring 17 to the conducting trunnion 30 of the stabilizing gyroscope where they are connected to the spring 40 and the member 32. The ball bearing 35 and the plate 39 of this trunnion are connected by leads 120 to two of the terminals of the three phase windings 121 of the stator of the stabilizing gyroscope, the third terminal being grounded through the conducting trunnion 31 at the opposite side of the case.

The servo motor 13 may be of any suitable reversible type. As shown herein it is a three phase motor having two of its terminals connected to the mains 107 and 108 by conductors 122 and 123 respectively. The other terminals of the motor are connected by conductors 124 and 125 to brushes 53‴ and 53⁗ which bear against the slip rings 48 and 49. A pair of leads 126 is connected to these slip rings and carried to the stabilized ring 7 in the neighborhood of one of its trunnions 8 and thence along the ring to the outer terminals of the conducting trunnion 6 at the west side of the instrument. The terminals of this trunnion which are associated with the ring 5 are connected by means of leads 127, carried along this ring to the terminals 82 of the contacts 15. The cooperating contact 14 is grounded through the case of the main gyroscope as previously explained. For the purpose of preventing sparking at the contacts the slip rings 48 and 49 are connected through a resistance 128 the midpoint of which is grounded.

In the operation of the complete apparatus described above the current is supplied to the stators of the main and stabilizing gyroscopes over the circuits and through the conducting trunnions as shown in the drawings and described above. In order that the rotor 1 of the main gyroscope shall precess in a direction to cause the instrument to operate in the proper manner, it must spin clockwise, as indicated by the arrows in Fig. 8, when the center of gravity of the gyroscope is below its supporting axis 6—6. If it be above this axis the rotor must spin counterclockwise. The rotor of the stabilizing gyroscope 18 may spin in either direction since its only purpose is to stabilize the ring 7 about its north-south axis 8—8 to maintain the east-west axis 6—6 in fixed relation to the surface of the earth to prevent the contacts 15 on the inclined ring 5 from being displaced due to rolling and pitching of the craft upon which the compass is carried.

Whenever the gyroscopic element is displaced from its normal position with respect to the points of the compass, the torque produced by the pendulousness of the element about its axis 6—6 as the earth turns away from or toward the fixed plane of rotation of the rotor, will cause the rotor to precess about an axis perpendicular to the axis 6—6, thus shifting the trolley 79 from its normal position between the two contacts 15 on to one of these contacts to energize the servo motor 13 over the circuits described in connection with Fig. 14. The servo motor will drive the azimuth gear 70 through the gear train consisting of pinion 63 on the shaft of the motor, gear 64, pinion 66, gear 67, and pinion 69 meshing with the azimuth gear 70. Were it not for the backlash in the gears and the inertia of the moving parts of the servo motor the trolley 79 would remain upon the contact 15 upon which it was shifted by the precession of the rotor, to permit the servo motor to be driven continously in one direction. Owing, however, to these factors the trolley 79 will usually oscillate between the two contacts 15, even when the gyroscopic element is not seeking the meridian. The effect of the meridian-seeking precession of the rotor will, when combined with the oscillatory movement of the trolley 79, result in the trolley remaining for a longer period upon one of the contacts 15 than upon the other so that the servo motor will cause a progressive movement of the shell 9 and the parts mounted thereon including the stabilized ring 7, the inclined ring 5 and the case 3. The precessional motion of the rotor 1 while seeking the meridian will result in a gradual shifting toward the meridian of its high point, and the servo motor will turn the case about the rotor axis 2—2 to keep the upper trunnion 4 at the high point of the rotor. This action will take place whenever there is any precession of the rotor due to the torque about the axis 6—6 resulting from the relative movement between the earth and the rotor. When the direction of precession changes, as occurs at the eastern and western limits of the meridian seeking oscillations of the gyroscopic element, the trolley 79 will act in connection with the contacts 15 to reverse the direction of rotation of the servo motor to cause the shell 9 and parts mounted thereon to turn the case 3 in one direction or the other about the rotor axis 2—2 to continually maintain its upper trunnion 4 at the high point of the rotor under the new conditions of precession. This action will continue until the gyroscopic element has finally reached its settling point with the axis 4—4 lying in the plane of the meridian and at an inclination $\alpha \pm \alpha_L \pm \alpha_S$ to the surface of the earth corresponding to the latitude at which the the instrument is located and the speed and heading of the craft.

The mass 21 for damping the oscillations of the gyroscopic element is shown in Figs. 8 and 9 in the form of an annular member surrounding the lower hub of the case with sufficient clearance to allow for the relative movement between the mass and the case during the oscillations of the element. The annular member 21 functions in precisely the same manner as does the mass 21 shown in Figs. 3 and 4 and described above.

Whenever the course of the craft is changed the movement in azimuth of the shell 10 which bears a fixed relation to the craft, will tend to carry along the inner shell 9 and the parts mounted thereon including the stabilized ring 7, the inclined ring 5, and the case. There will then be a change in the relative position of the ring 5 and the case 3 due to the fact that the trunnions 6, 6 of the ring move in a horizontal plane on account of their connection to the stabilized ring 7 while the case turns about the inclined axis 2—2 common to it and the rotor. This relative movement between the case 3 and the ring 5 will result in a displacement of the trolley 79 on to one of the contacts 15 to energize the servo motor 13 to turn the shell 9 in a direction opposite to that in which it tends to turn by the movement of the outer shell 10. The case will thus be brought back to its normal position with respect to the rotor and the trolley 79 will be restored to its neutral position with respect to the contacts 15. It will be understood that in the actual operation of the instrument the displacement of its parts and the time required for the operations described above will be of small magnitude, so that in practice the inner shell 9 and the parts mounted thereon, including the compass card 28, will be maintained in their true position with respect to the gyroscopic element and hence with respect to the points of the compass, while the outer shell 10 carrying the lubber's line 29 will turn with the craft so that the angle between this line and the north or zero point of the compass card will indicate at all times the heading of the craft. It will also be understood that the plate 74 of the transmitter partakes of the motion of the servo motor to control the circuits of repeater compasses and produce a movement of their compass cards corresponding to that of the compass card of the master compass, or to hold their compass cards in true position with respect to the points of the compass at all times. Since the readings of the master compass are not subject to errors due to the effects of the movement of the craft, the necessity for applying corrections to the readings of the repeater compasses will be eliminated.

In Figs. 8 to 13 inclusive the parts of the instrument are shown with the zero or north point of the compass card scale coinciding with the lubber's line and the speed correction arm 90 set at zero. As the craft acquires headway the arm 90 will be shifted by hand in accordance with changes in speed. This movement of the arm will result in a corresponding circumferential movement of the cam ring 86 in its supporting brackets 87. On account of the cam slots 89 the circumferential movement of the ring 86 will result in a displacement of the ring in its own plane toward the north or south according to the direction in which it is turned, as will appear most clearly from a consideration of Fig. 10.

Assuming that the ship is heading due north and that the speed is increasing, the displacement of the ring 86 will be toward the north and will produce a corresponding movement of the free end of arm 95, which will move the pin 97 inwardly through the trunnion 8 within which it is mounted. This movement of the pin will shift the bell crank lever 98 to lift the end of the arm 100 (see Fig. 13), thus tending to lift the link 105, but since the lower end of this link is connected to the ring 17 of the stabilizing gyroscope 18, the result will be to tilt the stabilized ring 7, upon which the arm 100 is mounted, about its axis 8—8 in a clockwise direction as viewed from the south. This tilting of the stabilized ring 7 will through the trunnions 6, 6 elevate the west side of the inclined ring 5 and lower the east side. This movement of the ring 5 will shift the contacts 15 to cause them to maintain their neutral position with respect to the trolley 79 as the latter is displaced due to the effect upon the gyroscopic element of the northerly movement of the craft at varying speeds.

If the speed of the craft be decreased the arm 90 will be swung in the reverse direction to move the cam ring 86 so that it will be displaced toward the south as the cam faces 89 engage the cooperating rollers 88. The action of the spring 106 through the link 105 will hold the free end of arm 100 against the end of bell crank lever 98 and push the pin 97 outwardly to keep the roller 96 in engagement with the inner edge of the cam ring 86. At the same time the stabilized ring 7 will be tilted about its axis 8—8 in the opposite direction thus bringing the axis 6—6 of the inclined ring 5 back toward its normal position with respect to the surface of the earth and moving the contacts 15 in the opposite direction to maintain them in normal relationship to the trolley 79 to correspond to the new position of the gyroscopic element due to the new speed of the craft.

In the preceding description of the operation of the correcting mechanism it has been assumed that the craft is heading north, but if the course of the craft be changed, the outer shell 10 together with the cam ring 86 mounted thereon will move about the inner shell 9 upon which the gyroscopic element is mounted, thus displacing the roller 96, which is in engagement with the inner edge of the cam ring, in one direction or the other from the position shown in Fig. 10. The displacement of the cam ring 86 in its own plane is such that the parts of the ring located at points 90° from the cam surfaces 89 move tangentially to the ring so that there is substantially no change in the space between the inner face of this ring and the outer face of the inner shell 9 upon which the arm 95 is mounted. It follows from this arrangement that when the arm occupies a position with respect to the cam ring at 90° from that shown in Fig. 10, it will not be affected by the displacement of the cam ring. This will be the position of the parts when the craft is heading east or west, and under these conditions there is no meridional component of the speed of the craft and hence the contacts 15 do not require to be shifted since there is no displacement of the trolley 79. The greatest movement of the contacts 15 for any given speed of the craft will occur when the craft is heading north or south. For intercardinal courses the roller 96 will occupy a position between that shown in Fig. 10 and a position 90° therefrom, according to the heading of the craft, and the stabilized ring 7 will be tilted about its axis 8—8 in the manner described to compensate for the displacement of the trolley 79 due to the meridional component corresponding to the course of the craft at the given speed. Since the speed of the craft is not changed frequently the correction mechanism may be set manually by altering the position of the arm 90 as may be required, but it will be understood that, if desired, the cam ring 86 may be shifted automatically in accordance with changes in speed of the craft by suitable mechanism actuated by the engines.

The necessity for applying a latitude correction when the form of damping arrangement shown in Figs. 8 and 9 is employed, has already been described in connection with simplified Figs. 3 and 4. In order that the contacts 15 may be shifted to compensate for the movement of the trolley 79 caused by the effect of changes in latitude, the pivot of the arm 100 is arranged so that it may be shifted with respect to the stabilized ring 7 by means of the nut 103 which is graduated in units of latitude. The other end of the arm 100 may then be regarded as the fulcrum so that when the rod 101 which carries the pivoted end of the arm is moved by means of the nut 103, there will be a corresponding tilting of the stabilized ring 7 about its axis 8—8 due to the fact that the lower end of the link 105 is connected to the ring of the stabilizing gyroscope, which is therefore maintained in a fixed plane with respect to the surface of the earth.

After the arm 90 has been set for the speed at which the craft is moving, and the nut 103 has been set for the latitude of the craft, the correction for variation in the meridional component of the speed of the craft will be applied automatically by the movement of the arm 95 as its roller 96 engages different portions of the inner face of the cam ring 86. The contacts 15 will thus be shifted in accordance with the displacement from normal position of the trolley 79 due to the effect of such components upon the gyroscopic element. Since the trolley is thus maintained in neutral position with respect to the contacts 15 the servo motor 13 will not be energized and there will be no deviation of the compass, or, in other words, the compass card 28 will be maintained in true position with respect to the points of the compass irrespective of the course, speed and latitude of the craft.

If for any reason the servo motor fails to function properly to maintain the compass card 28 in its true relation with respect to the gyroscopic element during changes in course of the craft, the inner shell 9 and the parts mounted thereon will follow the movement of the outer shell 10. The case 3 will turn freely about the axis 2—2 common to it and the rotor with corresponding changes in the inclination of the ring 5 due to the fact that the trunnions 6, 6 which connect the ring to the stabilized ring 7 move in a horizontal plane while the case moves about the rotor which maintains its plane of rotation fixed with respect to the surface of the earth so long as it is spinning. There will thus be no danger of injury to any of the parts of the instrument, and they will be ready to resume their usual operation when the defective condition has been corrected. It may be necessary that the gyroscopic element be allowed to resettle before correct indications can be again obtained, but beyond the delay and inconvenience caused by possible displacement of the element there will be no ill effects due to accidental failure of the servo motor to perform its intended function.

Instead of the mass 21 for damping the oscillations of the gyroscopic element various other arrangements may be employed such, for instance, an adaptation of the principle of liquid damping based upon the flow of liquid through a restricted passageway between two vessels. Such an arrangement is shown somewhat diagrammatically in Figs. 15 and 16 in which two tanks 129 and 130 are mounted upon the case 3 in any suitable manner, as by means of brackets 131. The tanks are connected by a restricted passageway 132 and filled with suitable liquid, such as oil, mercury or the like. The tanks are disposed in the north-south plane of the gyroscopic element and are normally in balanced condition about the axis 6—6. When the case tilts about this axis due to movement of the earth away from or toward the plane of the rotor, liquid will gradually flow from one of the tanks into the other. On account of the restricted passageway between the tanks the flow of liquid in a given direction will be out of phase with the position of the case which produces such flow, with the result that the movement of the case during meridian seekings oscillations will be opposed by the excess liquid in one or the other of the tanks at such periods during the oscillations as will produce a damping effect upon the gyroscopic element due to the work performed by the case in lifting the heavier tank and the friction effect of the restricted passageway.

No latitude correction is necessary when the damping arrangement of Figs. 15 and 16 is employed because the tanks lie in the north-south plane when the gyroscopic element occupies its normal position and therefore any shifting of the liquid from one tank to the other takes place in the vertical plane of the axis 4—4 and produces no torque about this axis.

While preferred embodiments of the several features of the invention have been shown and described, it will be understood that they may be embodied in other forms of gyroscopic instruments and that various changes in the details of construction of the elements of the instruments may be made without departing from the principle of the invention as defined in the appended claims.

I claim:

1. Gyroscopic apparatus comprising a mass, means for mounting the mass so as to spin about an axis inclined at a considerable angle to the surface of the earth and to tilt about a horizontal axis and means whereby a torque may be applied about the horizontal axis to orient the mass with respect to the points of the compass.

2. In gyroscopic apparatus, the combination of a rotatable mass, a support for the mass, a member in which the support is mounted upon an axis inclined at a considerable angle to the surface of the earth so that the spinning axis of the mass is also inclined at a considerable angle to the surface of the earth, a second member within which the first-named member is mounted upon a horizontal axis and means for imparting meridian seeking properties to the mass.

3. In a gyroscopic compass, the combination of a rotatable mass, a support therefor, and means for mounting the support to move about an axis inclined at a considerable angle to the surface of the earth and about an intersecting horizontal axis, the centre of gravity of the combined support and mass being below the intersection of the axes.

4. In a gyroscopic compass, the combination of a supporting element, a mass mounted to rotate freely within the element about an axis having a substantially constant inclination to the surface of the earth, and means for turning the element about the spinning axis of the mass when the compass is orienting.

5. In a gyroscopic compass, the combination of a supporting element, a mass mounted to rotate freely within the element about an axis inclined to the surface of the earth, means for turning the supporting element about an axis at a substantial angle to the axis of rotation whereby the supporting element has a component movement about the axis of rotation of the mass and means actuated by precessional movement of the mass and the element when the compass is orienting for controlling the turning means.

6. In a gyroscopic compass a pair of elements adapted to turn about an inclined axis independently of each other, means for causing continuous rotation of one of the elements about the axis, and means for causing the other element to turn about the axis when the compass is seeking the meridian.

7. In a gyroscopic compass, a pair of elements adapted to turn about a common axis independently of each other, means for causing continuous rotation of one of the elements about the axis, and means associated with the other element for imparting meridian seeing properties to the first named element upon turning of the second named element about the common axis.

8. In a gyroscopic compass, a pair of elements adapted to turn independently of each other about a common axis inclined to the surface of the earth, means for causing continuous rotation of one of the elements about the axis, a support for the other element movable in azimuth, and means for moving the support to turn the element mounted thereon about the axis when the compass is seeking the meridian.

9. In a gyroscopic compass, a pair of elements adapted to turn about an inclined common axis independently of each other, one of said elements serving as a support for the other, means for supporting the elements in pendulous relation to a pair of mutually perpendicular axes, one of which is inclined to the surface of the earth and the other of which is horizontal whereby precession takes place about the inclined axis when the compass is seeking the meridian and means actuated by such precessional movement for turning the supporting element about the common axis.

10. In a gyroscopic compass, a pair of elements adapted to turn about an inclined common axis independently of each other, one of said elements serving as a support for the other, means for supporting the elements in pendulous relation to a pair of mutually perpendicular axes, one of which is inclined to the surface of the earth and the other of which is horizontal whereby precession takes place about the inclined axis when the compass is seeking the meridian, a member movable in azimuth, a connection between the supporting means and the member, means for moving the member and means actuated by precessional movement of the elements for controlling the moving means to turn the supporting element about the common axis.

11. In a gyroscopic compass, a pair of elements adapted to turn about an inclined common axis independently of each other, one of said elements serving as a support for the other, means for causing continuous rotation of the supported element about the axis, a member upon which the supporting element is mounted, a frame adapted to move in azimuth and carrying the member, means for moving the frame, and means for controlling the moving means comprising a part associated with the supporting element and a part associated with the member.

12. In a gyroscopic compass for use on a moving craft, a pair of elements adapted to turn about an inclined common axis independently of each other, one of said elements serving as a support for the other, means for causing continuous rotation of the supported element about the axis, a member movable in azimuth upon which the supporting element is mounted, a frame fixed to the craft and carrying the member, means for moving the member in a reverse direction to that in which it tends to move by changes in course of the craft, and means actuated by movement of the supporting element about the common axis due to the last named movement of the member for controlling the moving means to produce such reverse movement of the member.

13. In a gyroscopic compass, a rotor and a case therefor, each adapted to move independently about a common axis, the case serving as a support for the rotor and being mounted to tilt about an axis perpendicular to the common axis, and means whereby tilting of the case and rotor about their supporting axis causes movement of the case about the common axis.

14. In a gyroscopic compass for use on a moving craft, a gyroscopic element and means for mounting the element so that it is pendulous about two mutually perpendicular supporting axes bearing a fixed relation to the spinning axis of the element and one of which is inclined to the surface of the earth, whereby the element may follow the movement of the craft over the surface of the earth.

15. In a gyroscopic compass for use on a moving craft, a gyroscopic element inclined at a considerable angle to the surface of the earth and means for mounting the element so that it is pendulous about two mutually perpendicular supporting axes bearing a fixed relation to the spinning axis of the element and one of which is inclined to the surface of the earth, whereby the element may follow the movement of the craft over the surface of the earth and maintain its normal inclination thereto.

16. In gyroscopic apparatus for use on a moving craft, the combination of a gyroscopic element supported upon an axis inclined at a considerable angle to the surface of the earth and a horizontal axis, and means whereby a torque may be applied about one of the axes to cause the element to precess about the other axis at an angular velocity equal to the horizontal meridional component of the angular velocity of the craft.

17. In gyroscopic apparatus for use on a moving craft, the combination of a gyroscopic element supported upon an axis inclined at a considerable angle to the surface of the earth and a horizontal axis, and means whereby a torque may be applied about the inclined axis to cause the element to precess about the horizontal axis at an angular velocity equal to the horizontal meridional component of the angular velocity of the craft.

18. In a gyroscopic compass, the combination of a mass, means for mounting the mass so as to spin about an axis inclined at a considerable angle to the surface of the earth and to tilt about a horizontal axis, means whereby a torque may be applied about the horizontal axis to cause the mass to seek the meridian and means for reducing changes in inclination of the spinning axis of the mass during such meridian seeking movement to damp the oscillations of the compass.

19. In a gyroscopic compass, a gyroscopic element having its axis of rotation inclined to the surface of the earth, and means for damping the oscillations of the element about the meridian comprising a mass pivotally mounted upon the element about an axis lying at an angle to the normal north-south plane of the axis of rotation.

20. In a gyroscopic compass, a gyroscopic element having its axis of rotation inclined to the surface of the earth, and means for damping the oscillations of the element about the meridian comprising a pendulous mass mounted to swing about an axis lying in the plane of the element at an angle to the normal north-south plane of the axis of rotation.

21. In a gyroscopic compass, a rotor, a case within which the rotor is mounted to spin about an axis inclined to the surface of the earth, and normally lying in the plane of the meridian, and a mass pivotally attached to the case to swing about an axis, the north end of which lies to the west of the plane of the meridian.

22. In a gyroscopic compass, the combination of a meridian seeking gyroscopic element, a support for the element, means for moving the support in accordance with the meridian seeking movement of the element, and means for controlling the actuation of the moving means including a part movable about an axis inclined to the axis of movement of the support.

23. In a gyroscopic compass, the combination of a meridian seeking gyroscopic element means for mounting the element to precess about an inclined axis, a support for the mounting means, means for moving the support in accordance with the meridian seeking movement of the element, and means for controlling the actuation of the moving means including a part associated with the element and adapted to move about the precessional axis therewith.

24. In a gyroscopic compass, the combination of a gyroscopic element including a rotor and a case surrounding the same, a member upon which the case is supported upon an inclined axis, means for moving the member to turn the case about the rotor axis while the gyroscopic element is seeking the meridian, and means for controlling the actuation of the moving means including a part associated with the case and a part associated with the member.

25. In a gyroscopic compass, the combination of a gyroscopic element including a rotor and a case surrounding the same, a member upon which the case is supported upon an inclined axis, contact mechanism consisting of a part associated with the case and a part associated with the member, a motor adapted to be energized when the parts of the mechanism are moved relatively to each other by displacement of the gyroscopic element with respect to its supporting member during meridian seeking movements thereof, and connections between the motor and the supporting member for moving the latter to turn the case about the rotor axis to bring the parts of the mechanism into normal relation to each other.

26. In a gyroscopic compass, the combination of a gyroscopic element, a member upon which the element is mounted, a motor for driving the member, contact mechanism for controlling the motor comprising relatively movable elements actuated by relative movement between the element and the member, and means for shifting one of the elements of the mechanism relatively to the other in accordance with functions of the movement of the craft upon which the compass is carried.

27. In a gyroscopic compass, the combination of a gyroscopic element, a member upon which the element is mounted, a motor for driving the member, contact mechanism for controlling the motor comprising relatively movable elements actuated by relative movement between the element and the member, and means for shifting one of the elements of the mechanism relatively to the other in accordance with a function of the course of the craft upon which the compass is carried.

28. In a gyroscopic compass, the combination of a gyroscopic element, a member upon which the element is mounted, a motor for driving the member, contact mechanism for controlling the motor comprising relatively movable elements actuated by relative movement between the element and the member, and means for shifting one of the elements of the mechanism relatively to the other in accordance with a function of the speed of the craft upon which the compass is carried.

29. In a gyroscopic compass, the combination of a gyroscopic element, a member upon which the element is mounted, a motor for driving the member, contact mechanism for controlling the motor comprising relatively movable elements actuated by relative movement between the element and the member and means for shifting one of the elements of the mechanism relatively to the other in accordance with a function of the latitude of the position of the craft upon which the compass is carried.

30. In a gyroscopic compass, the combination of a gyroscopic element having its spinning axis inclined at a considerable angle to the surface of the earth, a support for the element, means for moving the support in accordance with movements of the element, and means for preventing movement of the support due to the effect upon the element of the movement of the craft upon which the compass is carried.

31. In a gyroscopic compass, the combination of a gyroscopic element having its spinning axis inclined to the surface of the earth, a support for the element, a motor for moving the support, mechanism for controlling the motor having a relatively fixed part and a part actuated by movement of the element, and means for moving the relatively fixed part of the mechanism to correspond with the movement of the other part due to the movement of the element caused by the effect thereon of the speed of the craft upon which the compass is carried.

32. In a gyroscopic compass, the combination of a gyroscopic element, a member upon which the element is mounted, a motor for driving the member, mechanism comprising cooperating contact elements for controlling the motor, a member adapted to be displaced in accordance with meridional components of the movement of the craft and connections between the second named member and one of the contact elements for shifting the element to prevent actuation of the motor due to the effect upon the gyroscopic element of the movement of the craft upon which the compass is carried.

33. In a gyroscopic compass for use on a moving craft, the combination of a gyroscopic element, a member movable in azimuth, means for mounting the element upon the member, a motor for driving the member, mechanism for controlling the motor comprising cooperating contact elements one of which is associated with the gyroscopic element and the other with a part of the mounting means, and means for displacing said part of the mounting means in accordance with meridional components of the movement craft to prevent actuation of the motor due to the effect upon the gyroscopic element of the movement of the craft.

34. In a gyroscopic compass for use on a moving craft, the combination of a gyroscopic element, a member movable in azimuth, means for mounting the element upon the member, a motor for driving the member, mechanism for controlling the motor comprising cooperating contact elements one of which is associated with the gyroscopic element and the other with a part of the mounting means, a cam ring mounted on the member, means for displacing the cam ring in accordance with the speed of the craft, a member associated with the mounting means, a connection between the last named member and the part of the mounting means having a contact element associated therewith, and means cooperating with the cam ring and the last named member for displacing the said part and the contact element associated therewith in accordance with north-south components of the speed of the craft.

35. In a gyroscopic compass, a gyroscopic element, a member upon which the element is mounted, a motor for moving the member in azimuth, mechanism for controlling the motor including a pair of cooperative contact elements, a support for the member adapted to be attached to the craft on which the compass is carried, a cam member mounted on the support, a part coacting with the cam member and movable with the gyroscopic element and the member on which it is mounted and means whereby displacement of the gyroscopic element and the member with respect to the support causes the part to shift one of the contact elements to compensate for the effect upon the gyroscopic element of the movement of the craft.

36. In a gyroscopic compass, a gyroscopic element, a member upon which the element is mounted, a motor for moving the member in azimuth, mechanism for controlling the motor including a pair of cooperative contact elements, a support for the member adapted to be attached to the craft on which the compass is carried, a cam member mounted on the support, means for displacing the cam member in accordance with the speed of the craft, a part coacting with the cam member and movable with the gyroscopic element and the member on which it is mounted and means whereby displacement of the gyroscopic element and the member with respect to the support causes the part to shift one of the contact elements to compensate for the effect upon the gyroscopic element of the speed of the craft.

37. In a gyroscopic compass, a gyroscopic element, a member upon which the element is mounted, a motor for moving the member in azimuth, mechanism for controlling the motor including a pair of cooperative contact elements, a support for the member adapted to be attached to the craft on which the compass is carried, a cam member mounted on the support, means for displacing the cam member in accordance with the speed of the craft, a part coacting with the cam member and movable with the gyroscopic element and the member on which it is mounted, means for moving the part in accordance with the latitude of the craft and means whereby displacement of the gyroscopic element and the member with respect to the support causes the part to shift one of the contact elements to compensate for the effect upon the gyroscopic element of the speed of the craft.

38. In a gyroscopic compass for use on a moving craft, the combination of a gyroscopic element, a member on which the element is mounted, a motor for moving the member in azimuth in accordance with meridian seeking movements of the element, means for controlling the motor comprising a part associated with the gyroscopic element and a part associated with the member, a member movable in accordance with functions of the course and speed of the craft, and means under control of the last named member for rendering the controlling means ineffective when the gyroscopic element is affected by the movement of the craft.

39. In a gyroscopic compass for use on a moving craft, the combination of a gyroscopic element, an inner member within which the element is mounted, a second member upon which the inner member is mounted, a member movable in azimuth and carrying the second member, a motor for moving the azimuth member, mechanism for controlling the motor comprising a contact element associated with the gyroscopic element and a contact element associated with the inner member, means for maintaining the second member in a predetermined relation to the surface of the earth, and means movable in accordance with functions of the course and speed of the craft for altering said relation to shift the inner member and the contact element associated therewith to compensate for the effect upon the gyroscopic element of the movement of the craft.

40. In a gyroscopic compass for use on a moving craft, the combination of a gyroscopic element, an inner member within which the element is supported upon an inclined axis normally lying in the plane of the meridian, a second member upon which the inner member is mounted upon a normal east-west axis, a member movable in azimuth and upon which the second member is mounted about a normal north-south axis, a motor for moving the azimuth element, mechanism for controlling the motor comprising a contact element associated with the gyroscopic element and a contact element associated with the inner member, means for stabilizing the second member about its north-south axis, and means movable in accordance with functions of the course and speed of the craft for altering the stabilized position of the second member to turn the inner member about the supporting axis of the gyroscopic element and move the contact element associated with the inner member in accordance with the movement of the other contact element due to the effect upon the gyroscopic element of the movement of the craft.

41. In a gyroscopic compass the combination of a case, a mass mounted to rotate freely within the case, a member surrounding the case, means for supporting the case upon the member including trunnions and ball bearings cooperating therewith, a frame adapted to be moved in azimuth, means for moving the frame, means for supporting the member upon the frame including a plurality of trunnions and ball bearings cooperating therewith, and means comprising a part associated with the case and a part associated with the member for controlling the moving means.

42. Navigation apparatus comprising a gyroscopic element having its spinning axis inclined at a substantial angle to the surface of the earth, a course indicator, and means under the control of the element for maintaining the course indicator in true position with respect to the points of the compass.

43. In a gyroscopic compass, a gyroscopic element and means for supporting the element on two axes perpendicular to each other and to the spinning axis of the element in pendulous relation to both of said supporting axes, one of said supporting axes being inclined to the surface of the earth.

44. In a gyroscopic compass for use on a moving craft the combination of a gyroscopic element, an inner member within which the element is mounted upon an inclined axis, a second member upon which the inner member is mounted upon a horizontal axis, a member movable in azimuth and carrying the second member, a motor for moving the azimuth member, mechanism for controlling the motor comprising a contact element associated with the gyroscopic element and a contact element associated with the inner member and means for maintaining the second member in a predetermined relation to the surface of the earth to prevent energization of the motor due to oscillatory motion of the craft.

45. In a gyroscopic compass, a gyroscopic element, a support within which the element is mounted upon an axis inclined at a substantial constant angle to the surface of the earth, a member within which the support is mounted upon an axis perpendicular to said inclined axis and a gyroscopic element associated with the member for maintaining the axis of the support in a predetermined relation to the surface of the earth.

46. In a gyroscopic compass, a meridian seeking gyroscopic element having its spinning axis inclined at a substantially constant angle to the surface of the earth, a system of gimbal rings for supporting the element and a gyroscopic element having its spinning axis perpendicular to the surface of the earth associated with one of said rings for stabilizing the same.

In testimony whereof I affix my signature.

HARRY L. TANNER.

CERTIFICATE OF CORRECTION.

Patent No. 1,701,283. Granted February 5, 1929, to

HARRY L. TANNER.

It is hereby certified that error appears in the printed specification of the above numbered patent requiring correction as follows: Page 8, line 119, in the equation, strike out the plus and minus sign $\pm$ and insert instead a plus sign +; and that the said Letters Patent should be read with this correction therein that the same may conform to the record of the case in the Patent Office.

Signed and sealed this 19th day of March, A. D. 1929.

(Seal)

M. J. Moore,
Acting Commissioner of Patents.